United States Patent
Tom

(10) Patent No.: US 8,103,554 B2
(45) Date of Patent: Jan. 24, 2012

(54) METHOD AND SYSTEM FOR PLAYING AN ELECTRONIC BOOK USING AN ELECTRONICS SYSTEM IN A VEHICLE

(75) Inventor: Alfred C. Tom, San Francisco, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 222 days.

(21) Appl. No.: 12/712,145

(22) Filed: Feb. 24, 2010

(65) Prior Publication Data

US 2011/0208614 A1    Aug. 25, 2011

(51) Int. Cl.
G06Q 30/00 (2012.01)
(52) U.S. Cl. .................. 705/26.1; 709/231; 704/258
(58) Field of Classification Search ............... 705/14.58, 705/26.1; 709/219; 704/258, 270
See application file for complete search history.

(56) References Cited

U.S. PATENT DOCUMENTS

| | | | | |
|---|---|---|---|---|
| 5,577,459 A * | 11/1996 | Alden | ............................ | 116/234 |
| 5,986,690 A * | 11/1999 | Hendricks | ....................... | 725/60 |
| 6,633,741 B1 * | 10/2003 | Posa et al. | .................... | 434/317 |
| 6,704,733 B2 * | 3/2004 | Clark et al. | ................... | 705/26.1 |
| 6,990,464 B1 * | 1/2006 | Pirillo | ........................... | 705/7.29 |
| 6,992,687 B1 * | 1/2006 | Baird et al. | ................... | 715/805 |
| 7,191,131 B1 * | 3/2007 | Nagao | ........................... | 704/258 |
| 7,299,182 B2 * | 11/2007 | Xie | ............................... | 704/258 |
| 7,516,073 B2 * | 4/2009 | Kodama | ........................ | 704/270 |
| 7,877,460 B1 * | 1/2011 | Brouwer et al. | ............... | 709/217 |
| 7,962,337 B2 * | 6/2011 | Steinbiss | ........................ | 704/251 |
| 2002/0035697 A1 * | 3/2002 | McCurdy et al. | .............. | 713/200 |
| 2003/0065805 A1 * | 4/2003 | Barnes, Jr. | ..................... | 709/231 |
| 2006/0144317 A1 * | 7/2006 | Chan | .............................. | 116/236 |
| 2006/0256083 A1 * | 11/2006 | Rosenberg | ..................... | 345/156 |
| 2009/0107392 A1 * | 4/2009 | Brooks | .......................... | 116/236 |
| 2010/0066071 A1 * | 3/2010 | Kelaidis | ........................ | 281/15.1 |
| 2011/0050591 A1 * | 3/2011 | Kim et al. | ...................... | 345/173 |
| 2011/0081867 A1 * | 4/2011 | Issa et al. | ...................... | 455/66.1 |

FOREIGN PATENT DOCUMENTS

JP    2006031269 A    *    2/2006

OTHER PUBLICATIONS

Hodas, Joshua "NOVeLLA", International Journal of Speech Technology 4, 269-284, 2001.*

* cited by examiner

*Primary Examiner* — Yogesh C Garg
*Assistant Examiner* — Matthew Zimmerman
(74) *Attorney, Agent, or Firm* — John A. Miller; Miller IP Group, PLC

(57) ABSTRACT

A method and system for using a vehicle's electronic systems to provide all features and functions typically found on a handheld electronic book device. The vehicle's electronic systems can be used in an integrated fashion with a user's handheld electronic book device, such that the vehicle's systems can be used to recite electronic book materials, media files can be shared between the vehicle and the handheld device, bookmarks can be synchronized, and the user can seamlessly switch from one system to the other. The vehicle's electronic systems can also be used independent of any other electronic book device, such that the vehicle's systems provide all electronic book device functionality—including browsing for new reading materials, purchase, download, storage, reading, and listening.

19 Claims, 3 Drawing Sheets

METHOD AND SYSTEM FOR PLAYING AN ELECTRONIC BOOK USING AN ELECTRONICS SYSTEM IN A VEHICLE

BACKGROUND OF THE INVENTION

1. Field of the Invention

This invention relates generally to a method and system for using electronic books in a vehicle and, more particularly, to a method and system for buying, downloading, storing, and listening to electronic book materials using a vehicle's built-in systems—either with or without a separate electronic book device.

2. Discussion of the Related Art

Electronic book devices have become a popular choice for people who want to receive and consume their reading materials in an electronic format. Electronic book devices are available on the commercial market which feature large, easy to read screens, memory capable of holding thousands of books, and wireless network connectivity which allows fast and easy download of almost any publication which is available electronically. Many different types of publications are available in electronic book format, including books, magazines, and newspapers. Electronic book devices make it easy for a person to have multiple publications available for reading at any time, and keep track of what has been read with a bookmarking feature. The devices have become especially popular among people who spend a lot of time commuting or traveling.

Modern vehicles commonly include a variety of sophisticated electronic devices—including entertainment, communication, and navigation systems. Virtually all vehicles have stereo systems capable of delivering high quality audio, and most include the ability to interface an external audio source to the vehicle's stereo system, either wirelessly or via a cable. However, vehicles do not currently offer the ability to interface an electronic book device with the vehicle's electronic systems, other than in a very rudimentary fashion. Consumers would realize a significant benefit if they could interface their electronic book device with a vehicle's audio system, such that they could seamlessly transition from reading a publication on their electronic book device to listening to the same publication in their vehicle, even if their electronic book device does not include a text-to-speech feature. Additional benefits could be provided by offering other electronic book features—such as purchase, download, storage, and synchronization—on the vehicle's systems.

SUMMARY OF THE INVENTION

In accordance with the teachings of the present invention, methods and systems are disclosed for using electronic books in a vehicle. The vehicle's electronic systems can be used in an integrated fashion with a user's handheld electronic book device, such that the vehicle's systems can be used to recite electronic book materials, media files can be shared between the vehicle and the handheld device, bookmarks can be synchronized, and the user can seamlessly switch from one system to the other. The vehicle's electronic systems can also be used independent of any other electronic book device, such that the vehicle's systems provide all electronic book device functionality—including browsing for reading materials, purchase, download, storage, reading, and listening.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method and system for using electronic books in a vehicle is merely exemplary in nature, and is in no way intended to limit the invention or its applications or uses.

The present invention discloses various methods and systems for using electronic book materials and devices in a vehicle. The purpose of the methods and systems disclosed herein is to extend all of the functionality of a typical electronic book device to a vehicle environment, so that a user can seamlessly switch, for example, from reading a book on an electronic book device to listening to the same book in his or her vehicle, and vice versa.

As used in this disclosure, the term electronic book material(s) refers to the electronic form of a published material, such as a book or magazine, and the electronic file(s) that contain those materials. The files could either be in the form of written text and illustrations, such as a pdf (Portable Document Format, by Adobe Systems) file, or in the form of an audio file such as mp3. These types of files are referred to as media files. The terms electronic book device and handheld ebook unit in this disclosure refer to a hardware device used to read electronic book materials, such as those devices sold by Sony and Amazon.

One of the main reasons people use electronic book devices is so that they can read their chosen material wherever they are, whenever they have time. The reading materials may include daily newspapers, periodical publications such as magazines, and published books. The ability to download these materials on demand, and store them on a single portable device, is very attractive. However, many people spend a significant amount of time each day driving in a vehicle. For obvious safety reasons, drivers cannot read electronic books while driving, but they could listen to them.

Figure 1:
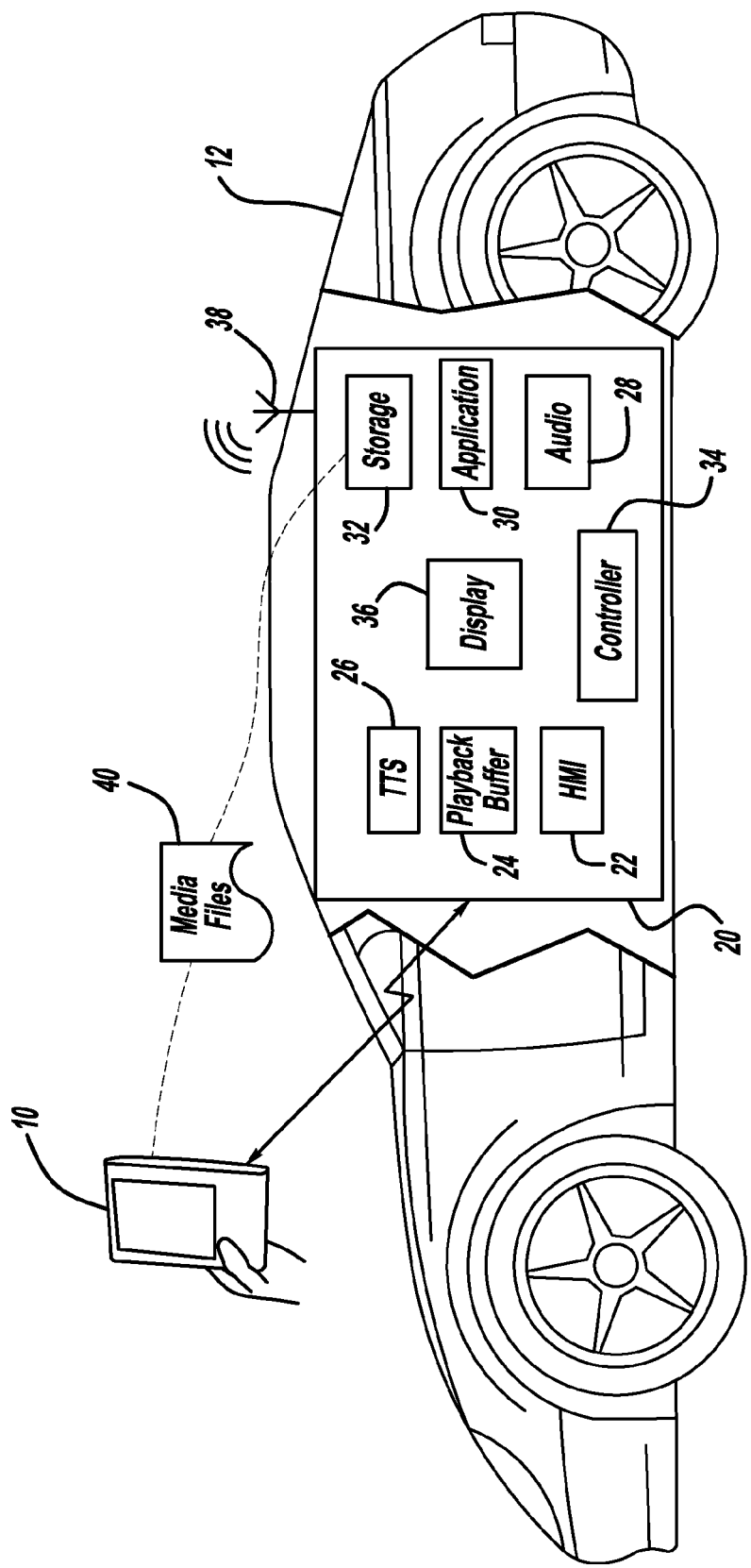
FIG. 1 is a block diagram of a vehicle-based system used in conjunction with an electronic book device.

FIG. 1 is an illustration of an electronic book device 10 and a vehicle 12 containing electronic systems 20. In a typical scenario, a user would be reading something on the electronic book device 10, and would like to switch from reading to listening to the material in the vehicle 12. The simplest way to offer this capability in the vehicle 12, for situations where the electronic book device 10 has a built-in text-to-speech converter, is to merely plug in the audio output of the electronic book device 10 to the audio input of the stereo system in the vehicle 12. This can be done with any modern vehicle today. However, if the electronic book device 10 does not have text-to-speech converter capability, it would be advantageous to provide this capability in the vehicle's electronic systems 20. The electronic book device 10 would be connected with the vehicle's electronic systems 20, either via a cable or wirelessly paired using the well-known Bluetooth standard or another wireless technology. Furthermore, although modern vehicles have the capability to play audio from the electronic book device 10 over the stereo system in the vehicle, it is unsafe to control the device 10 using the HMI on the device. Rather it is preferable for the user to use controls in the vehicle 12, such as buttons on the steering wheel or a speech recognition system, to control playback by the device 10. This requires a data connection between the vehicle 12 and device 10. This connection can be similar to the one used between a vehicle and an MP3 player today, although the signaling may need to be different. Finally, the text-to-speech capability in current handheld ebook devices is activated manually. It would be more convenient for the device 10 to automatically enable text-to-speech and audio playback when connected to the vehicle 12, and automatically disable text-to-speech and audio playback when the device 10 is disconnected from the vehicle 12.

In one embodiment, where the vehicle 12 serves solely as an interface to the separate electronic book device 10, the vehicle's electronic systems 20 could include a Human Machine Interface (HMI) 22, a playback buffer 24 for temporarily storing data during playback, a Text To Speech (TTS) system 26 for converting text from an electronic book media file to spoken output, and an audio system 28 including an amplifier and speakers. In another embodiment, where the vehicle 12 offers electronic book device functionality in its onboard systems, the vehicle's electronic systems 20 would also include a web browser or other application 30 for purchasing new electronic book materials, a storage system 32 which could include flash memory or other types of data storage, a controller 34, a display screen 36, and an antenna 38 for connecting to the internet or online stores. Media files 40 could reside on the electronic book device 10 or in the storage system 32 of the vehicle 12, as described below.

Figure 2:
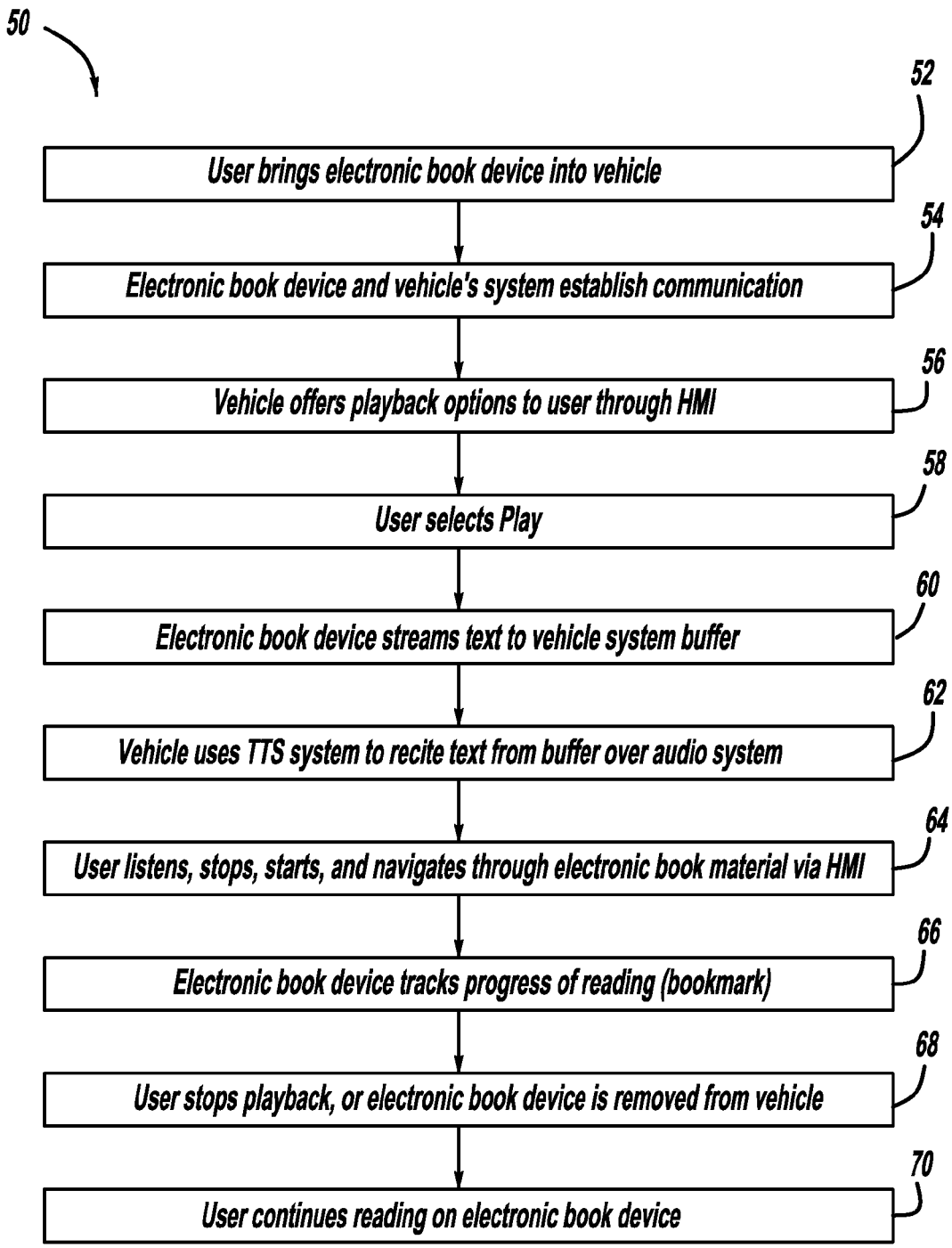
FIG. 2 is a flow chart diagram of a first process that can be used with the system shown in FIG. 1.

FIG. 2 is a flow chart diagram of a process 50 which could be used with the electronic book device 10 and the vehicle 12. In this embodiment, the vehicle 12 serves solely as an interface to the separate electronic book device 10. The process 50 begins at box 52 when the user brings the electronic book device 10 into the vehicle 12. If Bluetooth capability exists, when the electronic book device 10 is introduced into the vehicle 12, Bluetooth communication would begin automatically at box 54. In the case of a cable connection, communications would be established at box 54 when the user plugs in a cable connecting the device 10 to the vehicle 12. At box 56, the vehicle 12 would offer playback options to the user through the HMI 22, which could include a touch-screen system, a voice command system, or other types of interface. A key feature of the HMI 22 is that it is easy for a user to operate while driving the vehicle 12. In many cases, the next thing the user would do would be to select the Play option at box 58. Alternatively, the system may be set up to automatically start reading without the user having to select the Play option. The Play command would be passed from the vehicle 12 to the electronic book device 10, and at box 60 the electronic book device 10 would begin to stream text to the vehicle's playback buffer 24. At box 62, the vehicle 12 uses the TTS system 26 to recite text from the buffer 24 over the vehicle's audio system 28. From that point, as shown in box 64, the user can listen to the electronic book material, stop, start, and navigate through the material just as he or she would on the electronic book device 10 itself, except that the user would be using the vehicle's HMI 22 instead of handling the electronic book device 10. Throughout the process 50, the electronic book device 10 keeps track of the location of bookmarks, as shown at box 66. At box 68, the user stops playback, or simply removes the electronic book device 10 from the vehicle 12 to break the communications connection. The user can then continue reading documents on the electronic book device 10, as shown at box 70.

Throughout the process 50, two-way communication would be needed between the vehicle's electronic systems 20 and the electronic book device 10, so that the vehicle's electronic systems 20 could send the electronic book device 10 information, such as whether to continue reading, when to pause or resume, commands for navigation through the reading material, updated bookmark locations, and the rate at which text is being consumed. In this embodiment, all of the handling of the electronic book materials would remain with the electronic book device 10, including storage of the media files 40, bookmarking, and so forth. As such, when the user exits the vehicle 12 with the electronic book device 10, the electronic book device 10 would naturally be on the right page of the reading material, so that the user can continue reading. The vehicle's electronic systems 20 would be used to convert text to speech and play the sound, and would serve as an interface between the user and the electronic book device 10 for controls such as starting, stopping, and navigation, and would do so in a way that is simple for the user to operate.

In a slightly more advanced embodiment, the vehicle's electronic systems 20 could provide additional functionality via the electronic book device 10. This could include the ability to browse, purchase and download new electronic book materials from an online store. In this embodiment, the purchase, download, and storage of electronic book materials still occur on the electronic book device 10. The vehicle's electronic systems 20 are used only as an interface to the electronic book device 10, including the browse, purchase, and download functions, which would be supported via the HMI 22.

Figure 3:
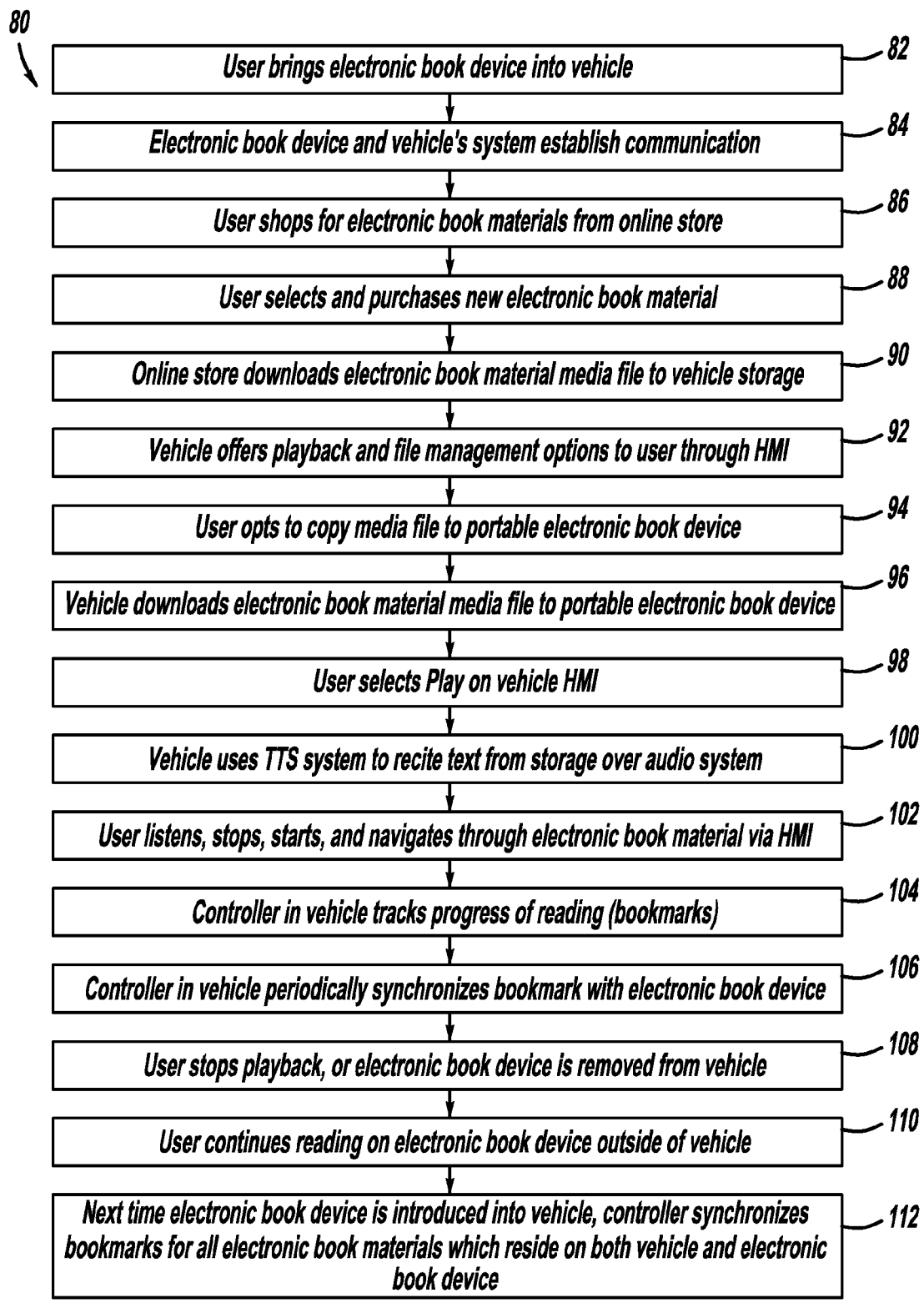
FIG. 3 is a flow chart diagram of a second process that can be used with the system shown in FIG. 1.

A user may find it even more convenient to have all of the capabilities for consuming electronic book materials embodied directly in the vehicle's electronic systems 20. FIG. 3 is a flow chart diagram of a process 80 in which the vehicle's electronic systems 20 shown in FIG. 1 provide all of the features and capabilities of a handheld ebook unit, and are used in conjunction with a user's separate electronic book device 10. The process 80 begins at box 82 when a user brings his or her electronic book device 10 into the vehicle 12. At box 84, the electronic book device 10 and the vehicle's electronic systems 20 establish communications, either wirelessly or otherwise, as described previously. At this point, the user may choose to shop for new electronic book materials from an online store at box 86. At box 88, the user selects and purchases a new electronic book material item, such as a daily newspaper. The online shopping and purchase activities would be carried out using the application 30 in the vehicle 12. The application 30 could be a full-function web browser, or it could be a purpose-dedicated application designed specifically for shopping for electronic book materials from specific online stores. At box 90, the online store downloads the newly purchased electronic book materials media file 40 to the storage system 32 in the vehicle 12. All of the browsing, purchase, and download communications are handled wirelessly between the vehicle 12 and the online store, with the vehicle 12 using the antenna 38. At box 92, the user can select from playback and file management options offered through the HMI 22. At box 94, the user opts to copy the newly purchased media file 40 to the electronic book device 10, in anticipation of wanting to read that material outside of the vehicle 12. The vehicle 12 then downloads the media file 40 to the electronic book device 10 at box 96.

The user can then proceed to listen to the newly purchased electronic book materials by selecting the Play option at box 98. At box 100, the vehicle 12 uses the TTS system 26 to recite text from the media file 40 stored in the storage system 32, using the audio system 28. At box 102, the user listens to the electronic book materials, stops, starts, and navigates through the material via the HMI 22. The controller 34 keeps track of progress in reading the material, as shown at box 104. At box 106, the controller 34 periodically synchronizes bookmarks with the electronic book device 10. Throughout the playback of the electronic book materials, the vehicle 12 could display the written material on the display screen 36, just as any handheld ebook unit does. This feature could be useful for non-driving passengers, or when the vehicle 12 is parked. At box 108, the electronic book device 10 is removed from the vehicle 12. The user could stop playback via the HMI 22, but this is not necessary as the playback would stop when the communication link between the electronic book device 10 and the vehicle's electronic systems 20 is broken. At box 110, the user can continue reading any chosen materials on the electronic book device 10 outside the vehicle 12. The electronic book device 10 would have bookmarks in the proper places for all materials consumed while in the vehicle 12, as the controller 34 handled this task at box 106. The next time the electronic book device 10 is introduced into the vehicle 12, the controller 34 would synchronize bookmarks for all electronic book materials which reside on both the electronic book device 10 and the vehicle's storage 32, as shown at box 112.

Throughout the process 80, the user could switch to any other electronic book materials which reside either on the electronic book device 10 or in the vehicle's storage 32. Also, electronic book materials which reside only on the electronic book device 10 could be uploaded to the vehicle's storage 32, and synchronization would thereafter be maintained.

In another embodiment, the vehicle's electronic systems 20 could provide all of the capabilities of a handheld ebook unit, without requiring a separate electronic book device 10. In this scenario, the vehicle's electronic systems 20 would have all of the elements and features of the system shown in FIG. 1. However, for a user who spends a lot of time driving and wants to use that time productively by listening to books, newspaper articles, and the like, and who does not need or want a handheld ebook unit, no separate electronic book device 10 would be necessary. All of the functions of a typical handheld ebook unit—including browsing, purchase, download and storage, reading or listening, bookmarking, etc.—would be provided by the vehicle's electronic systems 20. The user could listen to electronic book materials by using the vehicle's text-to-speech converter capability as described previously, read electronic book materials on a display screen 36 when the vehicle 12 is parked, or both. Another feature of this embodiment is that even if the user does have a handheld ebook unit, that unit does not need to be carried into the vehicle 12. The handheld ebook unit can be kept at home, for example, and the vehicle's electronic systems 20 can be used while driving. It is even possible to synchronize media files and bookmarks between the handheld ebook unit and the vehicle 12 without the unit ever being brought into the vehicle 12, by using multi-device support features offered by electronic media online stores.

It is emphasized that the flow chart diagrams in FIG. 2 and FIG. 3 are merely examples of processes that could be followed. Many other scenarios are possible, given the capability of the vehicle's electronic systems 20 to either provide electronic book functionality directly, or to serve as an interface to all features and functions on a separate electronic book device 10. In any such usage scenario, users would find it very convenient to be able to transition from listening in the vehicle 12 to reading on the electronic book device 10, while having all electronic media handled and synchronized automatically.

Some electronic book materials are available in audio file format as an alternative or complement to text files. In another embodiment, the vehicle 12 would have the ability to download and store the audio file versions of electronic book materials, and play them through the vehicle's audio system 28. The vehicle 12 could also maintain bookmark synchronization with a text file version of the same electronic book materials residing on an electronic book device 10. This approach would allow the user to purchase electronic book materials either via the vehicle 12 or the electronic book device 10, consume those materials using either the vehicle's electronic systems 20 or the electronic book device 10, and seamlessly transition from one to the other. In this embodiment, however, the vehicle 12 would not need a text-to-speech converter, as it would be playing audio files, which is a capability that virtually all modern vehicle audio systems would inherently have. Eliminating the need for a text-to-speech converter would lower the cost of the vehicle's electronic systems 20. This option may gain in popularity as audio file versions of electronic book materials become more widely available, especially if sellers allow consumers to download an audio file to one device and a text file to another device for the price of a single electronic book material purchase.

Throughout the preceding discussion, the concept of bookmarking has been mentioned repeatedly. Bookmarking is a common feature of handheld ebook units currently on the market, and becomes even more useful when electronic book materials reside on more than one device as disclosed in the present invention. In order for a user to get the most benefit out of bookmarking electronic book materials, bookmarks must be handled consistently between different devices, and should be handled in a way that is most intuitive to the user. These objectives can be met by placing bookmarks at a paragraph-based level of granularity. Page-based bookmarking is impractical because the notion of a page is vague in electronic book materials, since different devices have different size display screens, thus allowing one device to display more text at one time than another device does. And clearly, chapter-based bookmarking would be too coarse for most reading materials. On the other extreme, word-based bookmarking, and even sentence-based bookmarking, while technically feasible, are too fine in granularity to be intuitive to the user.

It is observed that most users, when they stop reading something and then resume again later, will begin reading at the paragraph where they previously stopped. If a user stops reading in the middle of a paragraph, he or she will usually re-read that entire paragraph for context. If a user stops reading after finishing a paragraph, he or she will resume later at the next paragraph. This natural pattern can be emulated in bookmarking electronic book materials. As used here, the term paragraph refers to the next coarser level of granularity from the sentence. The term paragraph does not necessarily only refer to a formal, indented paragraph, but could refer to any grouping of sentences, which could take other forms given the wide variety of publications which can be read on electronic book devices.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for using an electronic book device in a vehicle, said method comprising:

introducing a handheld electronic book device into the vehicle, wherein the handheld electronic book device includes at least one electronic book that may have been purchased;

establishing an electronic connection between the handheld electronic book device and a separate electronic systems onboard the vehicle, wherein the electronic systems includes at least a text-to-speech converter and an audio system;

in response to establishing the connection, automatically playing at least a portion of the at least one electronic book by at least streaming text of the electronic book from the handheld electronic book device to a playback buffer in the electronic system, converting the text to speech using the text-to-speech converter, and playing the speech in the vehicle using the audio system.

2. The method of claim 1 wherein the electronic book device is also configured to automatically turn on audio recitation using its own text-to-speech converter and the vehicle's audio system when connected to the vehicle, and automatically turn off audio recitation when disconnected from the vehicle.

3. The method of claim 1 wherein establishing the electronic connection between the electronic book device and electronic systems onboard the vehicle uses the Bluetooth wireless communication standard.

4. The method of claim 1 further comprising browsing for new electronic book materials to purchase and purchasing new electronic book materials from an online store.

5. The method of claim 1 further comprising storing electronic book media files on a vehicle storage system.

6. The method of claim 5 further comprising downloading a new electronic book media file from an online store to the vehicle storage system.

7. The method of claim 5 further comprising copying media files from the vehicle storage system to the electronic book device or from the electronic book device to the vehicle storage system.

8. The method of claim 5 further comprising visually presenting text from either the electronic book device or the vehicle storage system on a display screen.

9. The method of claim 5 wherein the media files are audio files.

10. The method of claim 1 further comprising tracking progress of reading electronic book materials via electronic bookmarks.

11. The method of claim 10 further comprising synchronizing electronic bookmarks between copies of electronic book materials on the electronic book device and a vehicle storage system.

12. The method of claim 10 wherein the electronic bookmarks are placed at the beginning of a paragraph immediately following a paragraph most recently completed.

13. A method for using an electronic book device in a vehicle, said method comprising:

introducing a handheld electronic book device into the vehicle, wherein the handheld electronic book device includes at least one electronic book that may have been purchased;

establishing an electronic connection between the handheld electronic book device and a separate electronic systems onboard the vehicle, wherein the electronic systems includes at least a text-to-speech converter and an audio system;

in response to establishing the connection, automatically playing at least a portion of the at least one electronic book by at least streaming text of the electronic book from the handheld electronic book device to a playback buffer in the electronic system, converting the text to speech using the text-to-speech converter, and playing the speech in the vehicle using the audio system;

wherein the electronic book device is also configured to turn on audio recitation using its own text-to-speech converter and the audio system when connected to the vehicle, and turn off audio recitation when disconnected from the vehicle.

14. The method of claim 13 further comprising storing electronic book media files on a vehicle storage system, and copying media files from the vehicle storage system to the electronic book device or from the electronic book device to the vehicle storage system.

15. The method of claim 14 further comprising tracking progress of reading electronic book materials via electronic bookmarks, and synchronizing the electronic bookmarks between copies of electronic book materials on the electronic book device and the vehicle storage system.

16. A system for using an electronic book device in a vehicle, said system comprising:

at least one or more computer processors having memory configured with executable instructions which when executed cause the at least one or more computer processors to:

establish a connection between a handheld electronic book device and a separate electronic systems onboard the vehicle, wherein the electronic systems includes at least a text-to-speech converter and an audio system and further wherein the handheld electronic book device includes at least one electronic book that may have been purchased;

in response to establishing the connection, automatically play at least a portion of the at least one electronic book by at least streaming text of the electronic book from the handheld electronic book device to a playback buffer in the electronic system, convert the text to speech using the text-to-speech converter, and play the speech in the vehicle using the audio system.

17. The system of claim 16 wherein the executable instructions further include instructions to use the Bluetooth wireless communication standard to establish the connection.

18. The system of claim 16 further comprising wherein the electronic book device includes a text-to-speech converter.

19. The system of claim 16 wherein the executable instructions further include instructions to:

shop for shopping for electronic book materials from online stores;

store electronic book media files in the vehicle;

manage, download, store, play, navigate, and synchronize electronic book materials in the vehicle; and display electronic book materials in the vehicle and interact with the application.

* * * * *